Patented Jan. 7, 1941

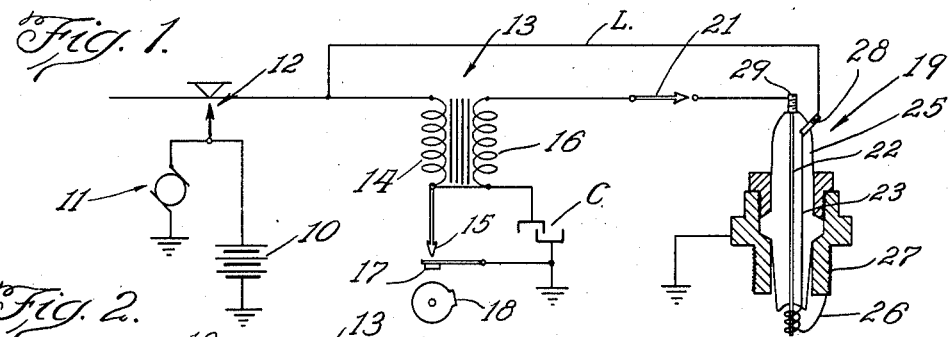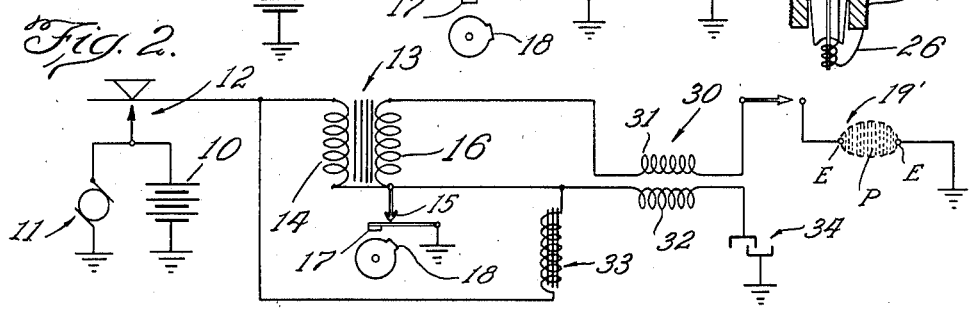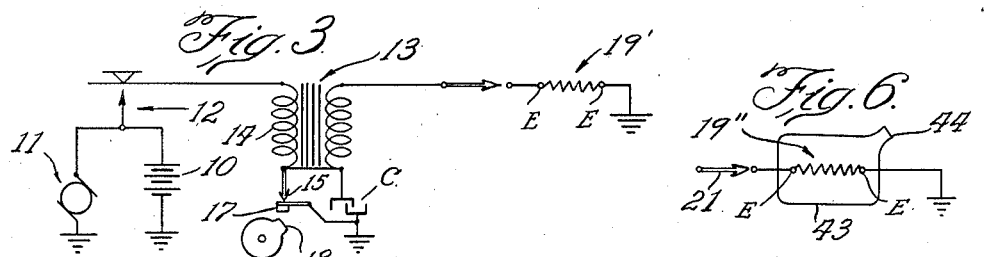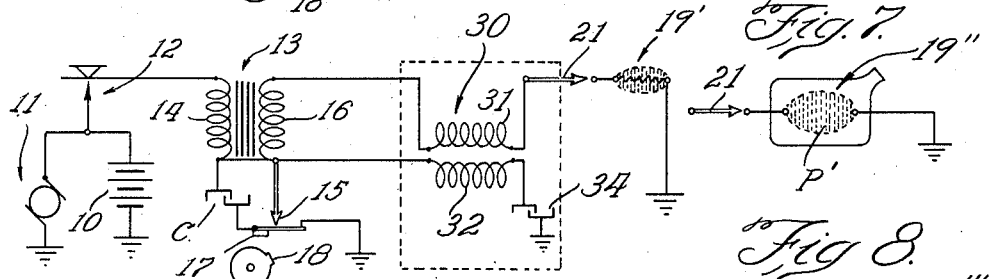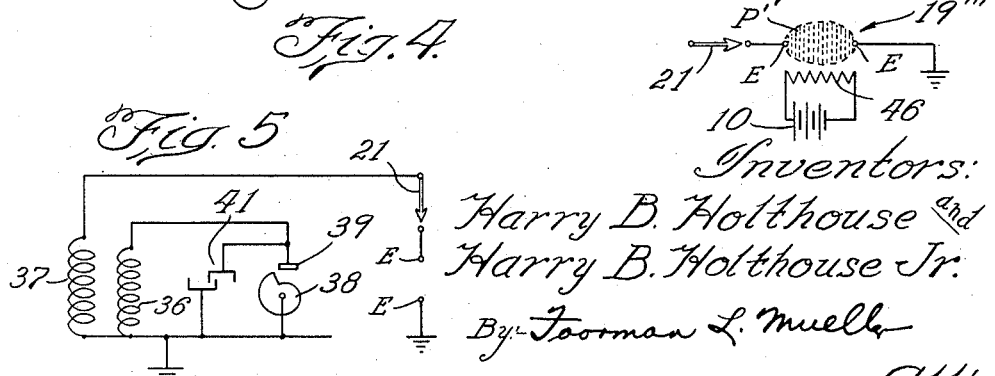

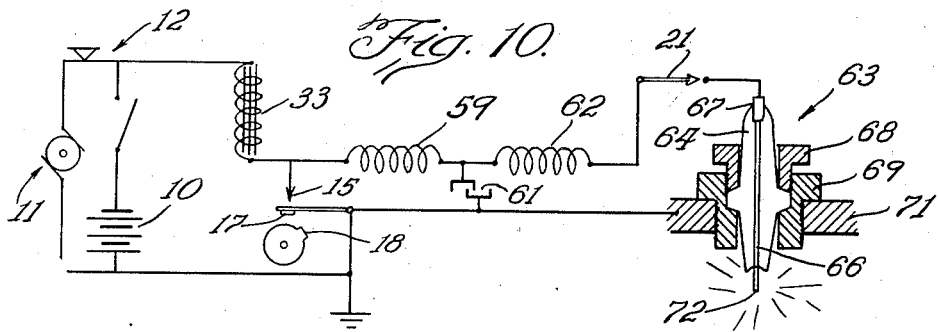
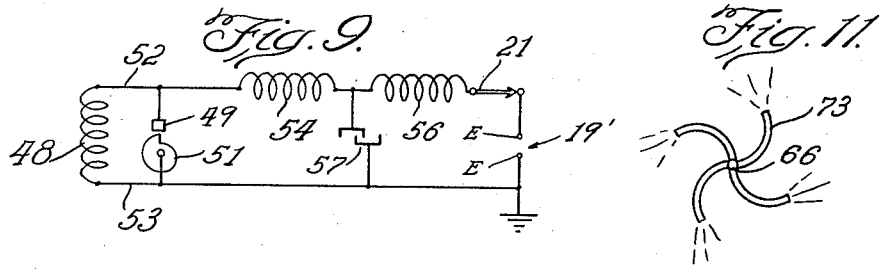
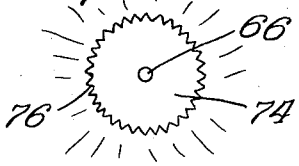
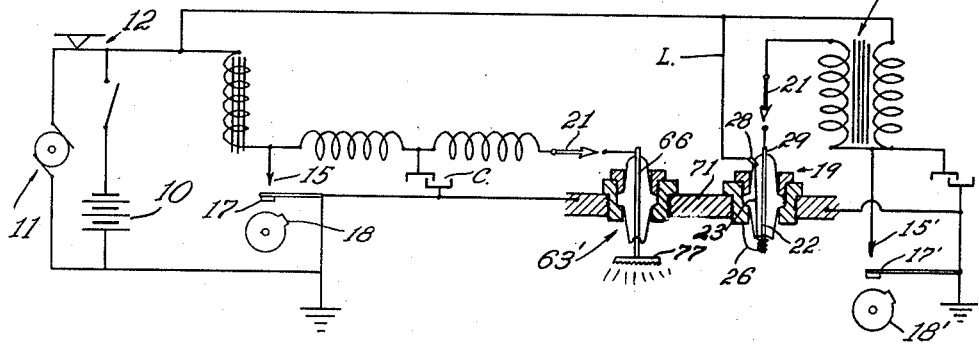

2,227,714

UNITED STATES PATENT OFFICE 2,227,714

ELECTRICAL SYSTEM FOR INTERNAL COMBUSTION ENGINES

Harry B. Holthouse and Harry B. Holthouse, Jr., Chicago, Ill.

Application May 16, 1938, Serial No. 208,236

22 Claims. (Cl. 123—148)

Our invention relates in general to ignition systems and more in particular to an ignition system for heavy duty engines of various types utilizing fuel oils or relatively low-grade gasoline, although the embodiments of our invention as hereinafter disclosed constitute a marked improvement over ignition systems for engines utilizing gasoline.

Although relatively satisfactory operation of the conventional ignition system is provided on passenger automobiles and similar relatively light-duty vehicles, due not only to the ignition system itself, but also to improved engine design, and improved fuels, the industry has faced continuing difficult problems in the operation of high compression engines burning gasoline and heavy-duty engines of various types burning low-grade fuels. The difficulties in all types of engines have been evident in high fuel consumption, burning of timer points, as well as stationary electrodes at a secondary gap, such as spark plugs, inability to operate an engine under load or idle the same at low speed without extreme jerkiness, fouling of spark plugs, and the actual stopping of the engine. In an effort to overcome these difficulties complicated engine systems as a whole have been employed, and relatively continuous and expensive servicing and maintenance have been required.

In attempting to correct the engine operating conditions by improvement in the ignition system, the industry has in general, except for the structure of Patent No. 2,059,237, and copending application Serial No. 741,610, encountered the difficulty of serious burning of spark plug electrodes and timer points, or equivalent structure, when attempting to provide a heavy output from the ignition system which in turn would provide improved combustion of the fuel in the engine.

Therefore, in attempting to overcome unsatisfactory operating conditions for engines and to provide a spark at the secondary such as to effect relatively satisfactory combustion in the cylinder of the engine, burning of the electrodes and timer points has been accepted with a resulting marked sacrifice in the life of such points and electrodes. On the heavy-duty fuel oil engines expensive engine design and the use of large expensive fuel pumps for fuel injection as well as for creating turbulence in the fuel mixture in a cylinder has been employed.

It is an object of our invention to provide an improved electrical system for all types of internal combustion engines to thereby provide improved engine performance.

A further object of our invention is to provide an ignition system for internal combustion engines which can accommodate a high-current output of from forty to two hundred milliamperes, and in some instances more than two hundred milliamperes, without destructive effect upon the condition or life of the timer points in the primary circuit of the ignition system, of the electrodes in a secondary gap, such as spark plug, or of equivalent structure in the primary and secondary circuits of either a battery or a magneto ignition system.

Another object is the provision of an electrical system for an internal combustion engine which will electrically create turbulence in the fuel mixture in such engine to prevent detonation therein, and improve the combustion thereof.

A still further object of our invention is to provide a high-current ignition system wherein the timer points and spark plug electrodes, or elements equivalent to these members, enjoy a particularly long life.

One of the features of our invention is the provision of means for ionizing the path or space intermediate the electrodes or contacts of a secondary gap to reduce the resistance in such path, so that such gap can accommodate a high-current output up to at least two hundred milliamperes without relative rapid destruction of the electrodes. The provision of a low resistance path across the secondary spark gap has been found to permit a proportionately heavy current to pass across the timer points or equivalent elements in the primary circuit of the ignition system without undesirable arcing at such points which normally tends to destroy the same.

Another feature of our invention is the provision of an electrical discharge unit for the electrical system of an internal combustion engine which provides an electrostatic discharge in a cylinder of such engine and directs the application of such discharge in a direction such as to provide maximum turbulence in the fuel mixture in the cylinder in accordance with any particular engine head, cylinder, and piston design.

Another feature of our invention is the generation of ozone as an accompaniment of the electrostatic turbulence creating discharge to provide a greater supply of oxygen for the fuel mixture and thereby improve combustion.

Another feature of our invention is the provision not only of improved engine performance during operation, but also of easier and quicker starting on all grades of fuel and particularly the lower grades.

A still further feature of our invention is the provision of a system for simplified, rapid, and accurate design of electrical systems for internal combustion engines by observing visible indications for the attainment of a low resistance path at the secondary gap, and electrically created turbulence in the fuel mixture of an engine.

Other objects and features of our invention will be apparent from the following description taken with the drawings; in which—

Fig. 1 is an illustration in schematic form of an ignition system embodying our invention.

Fig. 2 is a similar illustration of a further embodiment of the invention.

Figs. 3 and 4 are illustrations in schematic form of ignition systems providing spark discharges at the secondary gap which indicate to the eye two preliminary steps in obtaining an ignition system providing a spark discharge at the secondary gap of a configuration such as shown in Fig. 2.

Fig. 5 is an illustration in schematic form of a magneto ignition system which may be utilized in practicing the present invention.

Figs. 6 and 7 illustrate schematically a secondary gap structure in accordance with the present invention, such figures showing two steps with different visible indications at the gap as illustrating the attainment of an ignition circuit embodying the present invention.

Fig. 8 is a schematic illustration of a still further modification of our invention illustrating only the secondary gap and associated structure which may be substituted for similar structure in any of the circuit diagrams of Figs. 1 to 5 inclusive.

Fig. 9 is a schematic illustration of an ignition circuit employing a magneto which is adapted to utilize the spark plug shown in Fig. 10 to provide a further embodiment of our invention.

Fig. 10 is an illustration in schematic form of an electrical system in accordance with a further embodiment of our invention, illustrating particularly a spark plug in the system which is adapted to provide a space discharge of such a character as to create turbulence and generate ozone thus agitating and oxidizing the fuel in a cylinder of an internal combustion engine.

Figs. 11, 12, and 13, are somewhat schematic illustrations of fragmentary portions of an electrode for spark plugs representing embodiments of our invention, and adapted to direct electrostatic discharge in such directions as to create correspondingly directed turbulence in the fuel within the cylinder of an internal combustion engine.

Fig. 14 is a schematic illustration of an electrical system representing a further modification of the invention wherein two coil systems and corresponding spark plugs are provided to provide maximum ignition, and maximum turbulence for the fuel mixture in each cylinder of an engine. Fig. 14 illustrates the circuits of Fig. 1 and Fig. 10 operating in combination from a common storage battery.

As a preface to the detailed description, it is explained that the invention may be embodied in either a magneto system or a coil ignition system, both being considered electrical systems, of course, in the broad concept of the invention. A magneto ignition system, as well as a battery ignition system, is normally provided with a primary circuit including timer points or equivalent structure, and a secondary circuit including a pair of stationary electrodes spaced apart, or equivalent structure, for obtaining a fuel igniting spark in the cylinder of an engine to which the system is applied. In describing our invention the circuit making and breaking means in the primary circuit of the ignition system will be described as the timer with associated points, while the gap intermediate two points at a spark plug in the secondary circuit will be described as a spark gap. It is understood, however, that these are simply relative terms for purposes of clarity, and are not intended to limit the scope of the invention.

Referring now to the drawings, the ignition system illustrated schematically in Fig. 1 includes a battery 10, a generator 11 for charging the battery, and an ignition switch indicated generally by the reference character 12. A low frequency ignition coil 13 is provided in the system and includes a primary 14 and a secondary 16 with a timer unit including cooperating contacts, or points, 15 and 17, with a breaker cam 18 for moving the contact 17 to make and break the circuit in the usual manner. The timer unit is connected intermediate the primary winding of the coil 13 and ground, while a condenser C is connected between one end of the common primary lead and the secondary winding of the coil and ground in the usual manner. A spark plug 19 is connected into the secondary circuit of the ignition system, and while only a single spark plug has been illustrated, it is understood that any number of spark plugs may be included in the ignition system in accordance with the usual practice with a distributor 21 acting to connect each spark plug 19 into the circuit of the secondary winding 16 in the usual manner.

As previously mentioned in the introduction to the specification, it has been impossible in the present ignition systems, except those disclosed in copending application, Serial No. 741,610, and issued Patent No. 2,059,237, to obtain a high-current output from an ignition system so as to provide a spark discharge of such constituency as to accomplish satisfactory combustion for all types of fuel in all types of internal combustion engines without destructive action upon the electrodes at the secondary gap and arcing, and hence ultimate destruction of the timer points in the primary circuit. As a result, there have been definite limitations in a practical ignition system so far as a secondary output is concerned with a consequent limitation upon the current input to the ignition system. The spark plug 19 illustrated in Fig. 1 is constructed to provide a low-resistance path intermediate the electrode elements at the fixed gap at one end of the spark plug. We have found that a low-resistance path at the secondary gap, makes it possible to carry an extremely heavy current across this path and this condition in turn makes it possible to accommodate large current values without arcing at the timer, and hence destructive action upon the timer points. A center electrode 22 is carried in the porcelain insulator 25 in the usual manner, while the second electrode for the spark gap is provided in an element 23 of relatively stiff wire material which is supported in the insulator 25 away from the electrode 22 and extends out of the bottom of the insulator in the form of a self-sustaining coil 26. This surrounds the end of the electrode 22 and is spaced therefrom a distance corresponding relatively to the length of the spark gap desired for a particular ignition system in the same manner that the two electrodes of a spark plug are spaced apart in a gap in the conventional structure. For instance satisfactory results have been obtained with the center electrode 1/16" in diameter, and the coil 26, 1/4" to 1/2" in diameter, although the coil diameter can be still further increased if the base of the spark plug is large enough so that a coil of larger diameter can be accommodated from a mechanical standpoint. The coil 26 which is an integral extension of the electrode element 23 is connected to the usual metal shell 21 at one end and at the other end to a terminal 28 connected to one side of the battery 10 through a lead L. The center electrode 22 is connected to the usual terminal 29 which in turn is connected by a high-tension lead to the secondary 16 of the ignition coil. Although the coil electrode configuration might be troublesome from the standpoint of carbon accumulation in the conventional ignition systems, with the heavy currents used in practicing our invention such is prevented.

As to the operation of this system, upon closing of the ignition switch 12 the current passes over the wire L to the terminal 28 and through the electrode element 23—26 to ground, and due to the resistance of the electrode element it becomes heated and emits electrons so as to ionize the space or path intermediate the coil 26 and end of the electrode 22, thereby reducing the normal resistance in this path. Upon turning the engine so as to rotate the cam element 18 in the usual manner, the ignition coil is energized and a spark occurs at the secondary spark gap. Due to the preliminary action upon the spark gap by the coil 26 an intense hot spark occurs to provide easier starting. In addition to the improved starting of the engine, a much greater output can be accommodated at the secondary spark gap without undue destructive action, in fact, an output as high as 300 milliamperes has been utilized, although 40 to 60 milliamperes are more usually provided. To provide such a great output from the coil 13, it is necessary of course to increase the input to the winding 16, such input varying according to the particular design of the primary winding, of course.

A further modification of the invention is illustrated in Fig. 2 of the drawings. The circuit of Fig. 2 so far as general circuit design is concerned follows the disclosure of copending application, Serial No. 741,610, mentioned above. Those elements in the circuit of Fig. 2 which are similar to the elements of Fig. 1 are shown with the same reference characters. In addition to the low-frequency ignition coil 13, a high frequency coil 30 is provided including a secondary 31 connected to the secondary 16 of the low frequency coil, and a primary winding 32 connected to the primary 14 of the coil 13. A so-called "booster" or "kick" coil 33 is connected in parallel with the primary winding 14 of the coil 13 and is also connected at one end to the primary 32 of the high-frequency coil. The coil 33 with a single winding and an iron core may be described as a self-inducing transformer with a high impedance which takes its maximum current at very low speed of the engine such as may be provided in starting the engine, and this of course improves the normal starting of the engine utilizing this ignition system. The effectiveness of the coil 33 in the circuit decreases somewhat at higher engine speeds. A condenser 34 is connected between the primary 32 of the high-frequency coil 30 and ground to complete the high frequency circuit.

With the circuit of Fig. 2 a composite low-frequency and high-frequency current discharge is produced at the secondary gap 19', illustrated diagrammatically by simply a pair of circles E—E, representing fixed electrodes in a spark plug. The character of this composite current is such as to act itself to ionize the path between the electrodes E—E and reduce the resistance to accommodate a heavy output without destructive action on the electrodes. Furthermore, as mentioned above, the life of the timer points 15 and 17 is directly related to the resistance in the spark gap, such life increasing with a decrease in path resistance and consequent decrease in arcing at the points. Although there is a relatively slight undesirable effect upon the electrodes of the secondary gap and the timer points when the ratio of output between the coils 13 and 30 is 1 part of low frequency to 1 part of high frequency, the best results have been obtained with a ratio of one part low frequency to two parts high frequency, and this ratio may desirably be increased to a ratio of 1 part to 3 parts. That is, where destructive burning normally follows at the secondary gap of a system with an output of five milliamperes D. C. from a low-frequency coil alone, this destructive burning of points and electrodes is avoided when a high frequency coil as 30 is connected into the low-frequency coil circuit and wound in such a manner that a ten milliampere A. C. or high frequency output is added to the low frequency or pulsating D. C. output at the secondary gap 19. This of course is a ratio of 2 to 1, as between high frequency and low frequency in the system and can be determined with an A. C. meter and D. C. meter. Although five milliamperes and ten milliamperes are mentioned it is understood that these values may be increased many times. We have found that very desirable results are obtained in fact with the output as fifty milliamperes D. C. and one hundred milliamperes A. C.

In practicing the invention with respect to the embodiment of Fig. 2, the desired low resistance path at the secondary gap 19' is originally provided as a result of a series of steps in designing the circuit, as illustrated diagrammatically in Figs. 3 and 4. The desired condition in accordance with this invention obtained at the secondary gap 19' is accompanied by the production of an envelope visible to the naked eye as a luminous gaseous or heavy-vapor cloud of an orange-violet color which is substantially uniform over the entire volume of the cloud, and this appears in substantially the exact configuration illustrated by dotted lines at P in Fig. 2. The cloud or envelope corresponds to the space over which the spark discharge is diffused, which, as is apparent from the drawings, is a greater space than that over which the ordinary spark is diffused. In the original design of the circuit of Fig. 2 in accordance with our invention a low-frequency coil 13 is connected into a circuit including the elements referred to by reference characters identical with the corresponding elements in Fig. 1. In an ignition system of the prior art a low frequency coil as 13 is normally capable of accommodating no more than three amperes and providing an output of four milliamperes to produce a pulsating direct current spark across the electrodes as E—E in Fig. 3. This spark is visible through a glass panel or the like in a cylinder itself for a corresponding compression chamber, as an intense white line of the configuration of the jagged line in Fig. 3. With an ordinary spark plug and the ordinary type low-frequency coil 13, the ignition system of Fig. 3 is incapable of accommodating an output substantially more than four milliamperes without undesirable effect upon the electrodes of the spark plug, and the timer points 15 and 17 in the primary circuit. In building up to the desired low-resistance path as described above to accommodate satisfactorily, a greater output as evidenced by the visible cloud P in Fig. 2, a high-frequency coil 30 of known values for the primary and secondary windings 32 and 31, respectively, may be connected into the matching or test circuit with a primary 32 connected to the primary 14 of the coil 13 and the secondary 31 connected to the secondary 16 and the primary 32 grounded through a condenser 34 as above described. The condenser 34 in the circuit with the winding 32 provides an oscillating circuit. This addition to the circuit of Fig. 3 is illustrated in Fig. 4 within the dotted line outline. The windings 14 and 16 of the low frequency coil 13 may be varied, while at the same time retaining the same high-frequency coil 30 until the high-frequency component added to the low-frequency component of the complete current output of the system produces a visible indication at the spark gap 19' comprising the white jagged line indications mentioned with respect to Fig. 3, and a gaseous cloud of orange-violet color encompassing the jagged line yet not completely obliterating the same. This particular visible indication at the spark gap 19' shows that there is insufficient high frequency alternating or oscillating current to carry and diffuse completely the unidirectional pulsating direct current output of the secondary 16 of the coil 13. This visible configuration will be a further indication that the resistance at the secondary gap 19' will be too high to accommodate a current output of ten (10) milliamperes without undesirable effect upon the secondary gap electrodes and the timer points.

The characteristics of the windings 14 and 16 as well as 32 and 31 of the low frequency and high frequency coils, respectively, can be varied until the relative components of D. C. and A. C., or low and high frequency are proper at the secondary gap to prevent destruction with a high output. That is, an envelope P as shown in Fig. 2 can be obtained in the circuit of Fig. 4. As one example, a low frequency coil as 13 has been provided with 300 turns of #18 wire for the primary 14, and 10,000 turns of #30 wire for the secondary 16. The high frequency coil as 30 for the circuit had 4 turns of #14 wire for the primary 32, and 15 layers of #34 wire, with 70 turns per layer, for the secondary 31. The desired result can be immediately attained when the visible indication of Fig. 4 appears, however, merely by introducing a "kick" coil 33 as another means of increasing the high frequency current component. The coil 33 in combination with the low-frequency coil 13 will increase the pulsating direct current output to the primary winding 32 of the high-frequency coil and the output of the latter coil will then be of such value and of such composition including low-frequency and high-frequency current that the resistance across the secondary gap 19' is reduced to the place where a high-current output will be satisfactorily accommodated without undesirable results. This of course is evident in the envelope P previously described. With known values for the coils 13 and 30, assuming the desired resistance has been obtained with the circuit of Fig. 4 giving the indication (envelope P) of Figs. 2, or of coils 13, 30 and 33 as in Fig. 2. Corresponding coils may be manufactured to duplicate the test circuits, and provide an ignition circuit with the desired characteristics.

A conventional magneto system is illustrated schematically in Fig. 5. The magneto of such system includes a primary coil 36, a secondary coil 37, and circuit making and interrupting means, including a rotating contact element 38 and a stationary contact element 39. A condenser 41 is connected in shunt in the primary circuit and extends to a ground connection. The secondary gap is of course comparable to the secondary gap in any of the circuits in Figs. 1 to 4, inclusive, and the electrode elements are designated generally by the reference character E. Using a spark plug as 19 (Fig. 1) at the secondary gap of the magneto system, with the heater and ionizing electrode as 26 energized from the magneto a low resistance path is provided as previously described so that a heavy current output and consequently a heavier input can be accommodated without destructive burning of the electrodes at the secondary gap or the contact elements in the primary circuit. A comparable result can also be obtained by the use of secondary spark gap structure in combination with the magneto as illustrated schematically in detail in Figs. 6 to 8, inclusive, and as will be described.

To simplify the drawings and clarify the disclosure of the secondary spark gap structure alone, a further modification of our invention, is illustrated in a two-step sequence in Figs. 6 and 7. In the illustration of Fig. 6, a pair of electrodes E—E in a secondary gap 19" are illustrated as supported in an enclosure or vacuum chamber 43. With no vacuum on the secondary gap, the resistance of the path intermediate the electrodes E—E is normal, and with the structure of Fig. 6 connected into an ignition system with a pulsating direct current output, a jagged white line is visible intermediate the electrodes, just as described with reference to Fig. 3. A connection can be made to the enclosed space at 44 by means of a vacuum pump, and as the vacuum is increased and consequently the air pressure reduced within the chamber 43, the visible single line spark intermediate the electrode is gradually absorbed and at a vacuum of approximately 14 to 20 inches of mercury, a visible gaseous cloud or envelope P' of an orange-violet color forms as shown in Fig. 7. The gaseous envelope is simply a visible indication of the enlarged ionized path with a low resistance so that the spark is diffused over a relatively great area. When this visible indication, as shown in Fig. 7 is attained, the resistance of the path at the secondary gap is so low that heavy current output from the secondary of the ignition system and consequently heavy current input can be accommodated without burning of timer points or secondary gap electrodes.

The secondary gap structure of a further modification of our invention is schematically illustrated in Fig. 8. This gap structure as well as that illustrated in Figs. 6 and 7, can be incorporated into any of the circuits of Figs. 1, 3, or 5 in practicing the invention. The low-resistance path across the secondary gap 19''' is accomplished by ionizing such gap by means of an electron emitting filament 46 connected across the battery 10 and included in a closed circuit upon closing of an ignition switch 12 as described with reference to the embodiment of Fig. 1. The filament 46 may be energized from any desired separate source of current as well as from the battery 10 for the ignition system. Visible indication of the desired low resistance path condition at the secondary gap 19''' is provided in a gaseous envelope P' of the general nature of that previously described. In this connection it is noted that the visible cloud or envelope as P or P' is orange-violet in color when copper brass electrodes are employed for the spark gap, and such color is partially characteristic of the metal. However, a colored cloud or envelope approaching this color, and of the relative size illustrated has been obtained with electrodes of other metals. When the envelope P' occurs at such gap, high current input and output may be accommodated in the ignition system employing this structure without undesirable burning at the timer points, and at the gap electrode E—E.

The desired low resistance path across the secondary gap of a magneto ignition system can be obtained with any spark plug electrodes in a system such as illustrated in Fig. 9. This is a high frequency magneto system such as disclosed in Patent No. 2,059,237, and includes an inductance coil 48 and a combination timer and spark gap including a stationary contact 49 and a rotatable contact 51. The timer structure is connected to the inductance coil 48 by means of conductors 52 and 53 with the former likewise connected to the primary 54 of a high-frequency transformer. The secondary winding 56 of the high-frequency transfomer is connected intermediate the primary winding 54 and a spark gap comprising an ordinary spark plug which is designated by the reference character 19' inasmuch as this may be identical with the secondary spark gap of Fig. 2.

When the contacts 49 and 51 are in engagement a circuit is completed through the coil 48 during the period of excitation of the coil. When the circuit is broken by rotation of the contact 51, a high induced voltage is produced in the coil 54 which charges the condenser 57 in the circuit therewith. The condenser 57 discharges through the circuit comprising the primary winding 54 and the contacts 49 and 51 and with such elements comprises a high-frequency oscillating circuit. The current discharge in this circuit from the condenser 57 induces a corresponding current in the secondary winding 56 which is also in a high-frequency oscillating circuit with the condenser 57, and the output from the secondary circuit is discharged across the spark gap 19' including electrodes E—E. In obtaining a low-resistance path across the electrodes E—E with a resulting visible indication in the form of the gaseous envelope or cloud as P or P', the following values for the various elements of the system, as one particular example, may be employed. The coil 48 is provided with 9,000 turns of #30 wire, the primary 54 has 7 turns of #14 wire, while the secondary 56 comprises 1,750 turns of #34 wire. A .2 m. f. condenser is provided at 57.

These values, as described above, can be originally ascertained either by watching for the development of the orange-violet cloud and the values of either the windings 48 or 54 changed to effect such result, or a high frequency milli-ammeter can be connected into the secondary output line. Normally this cloud can be obtained with an output of at least 60 milliamperes A. C. In this circuit of course, just high frequency is produced.

As is well known it is necessary to have turbulence or agitation in the fuel mixture in the cylinder of an internal combustion engine because of the tendency of numerous fuels toward an abnormally high combustion temperature and pressure if compression is carried beyond certain limits. This phenomenon is known as detonation which of course is undesirable, and results normally in dissipating the force of explosion at a point in the cylinder head removed from the piston. It is therefore necessary in an internal combustion engine to provide turbulence in the fuel mixture in order to obtain a high operating efficiency and maintain a smooth performance. In internal combustion engines of all types at the present time the effective turbulence is created mechanically by means of the shape of the cylinder head or the shape of the cylinder head in combination with the means for injecting fuel into the cylinder. In an embodiment of our invention, we have found that turbulence in the cylinder head can be created through the application of high velocity electrostatic discharges to the fuel mixture in the cylinder head. Such electrically created turbulence has been found to be of marked importance in internal combustion engines utilizing all types of fuel, but particularly in heavy-duty engines burning low-grade fuels such as fuel oil. In these engines at the present time, the known mechanical means for creating turbulence are entirely inadequate to produce smooth operation of the engine at anything other than relatively high operating speeds, and when using a high current output from the ignition systems for such engines. This in turn produces destructive burning of the secondary gap electrodes as well as the timer points of such system and lessens the life thereof.

Numerous ignition coil circuits may be employed in combination with the spark plug structure of our invention to create turbulence in the cylinder of an internal combustion engine by electrical means rather than mechanical means. Such turbulence can probably also be described as agitation of the fuel mixture due to electrostatic repulsion. One such circuit is illustrated in Fig. 10 in combination with a spark plug embodying our invention. The entire system as illustrated comprises a storage battery 10, generator 11 for the battery ignition switch 12, and the usual timer contacts 15 and 17 as previously described. The coil circuit is a high-frequency circuit including a "kick" coil 33 similar to the corresponding coil in the circuit of Fig. 2, and a high-frequency coil including a primary 59 appropriately connected into a circuit with the condenser 61 and timer points 15 and 17, to provide a high frequency oscillating circuit. A secondary winding 62 for the high-frequency coil is connected in series with the primary 59 and comprises with the condenser 61 and the spark plug 63 another high-frequency oscillating circuit. The "kick" coil 33 serves to kick up or boost the voltage in the primary of the high-frequency coil to thereby provide a much greater output from the secondary 62, which of course is connected to the spark plug 63 providing a secondary gap.

The spark plug 63 comprises an insulator 64 with a single electrode 66 supported centrally thereof, and a terminal 67 at the top thereof for receiving a lead from the distributor 21. Two metal shells 68 and 69 are provided in the usual manner, the latter shell for supporting the insulator 64 and securing the entire plug into the cylinder head 71, while the former shell 68 acts to retain the insulator seated in the shell 69.

As is well known, the usual spark plug is provided with a second electrode mounted on a shell corresponding to the shell 69 and formed in a manner to provide with a center electrode in an insulator, an open spark gap. The engine itself is grounded and the battery circuit return is accomplished through common ground connections for the battery and engine. The usual second electrode connected to a shell corresponding to the shell 69 is therefore connected to ground, and the spark discharge in the complete ignition circuit through the battery passes across the gap provided by such two electrodes. This of course is true with the secondary gap structure illustrated in Figs. 1 to 9 inclusive and described in detail above. With the plug of Fig. 10, however, no specific second electrode is provided and the insulator 64 and the single electrode 66 therein are of such dimensions that the exposed point 72 of the electrode 66 is spaced as far away as possible from the bottom of the shell 69, and the cylinder head 71, as mechanical limitations in the material of these elements will permit. Where the normal gap setting for the spark plug in an ignition of the prior art is approximately .018 inch, particularly for heavy-duty engines, we prefer that the electrode-point 72 be at least one-half inch from any grounded metal surface adjacent such point. As stated above, there is no limit to the size of this gap so far as obtaining the desired results of our invention is concerned, except mechanical limitations in the design of the spark plug, and of the engine themselves.

As to the operation of this embodiment of our invention, we have found that turbulence or agitation in the fuel mixture can be obtained electrostatically with a frequency of between 100 and 1500 kilocycles and an operating voltage of from 5,000 to even 50,000 volts, if satisfactory insulation can be provided to accommodate such high voltage. The most satisfactory operating condition for an engine utilizing our invention is accomplished with the current frequency at approximately 500 kilocycles, and an output of approximately 30,000 volts. With an ignition system operating within these ranges, an electrostatic discharge occurs extending out in all directions from the exposed point 72 of the electrode 66, which carries far enough and is of great enough force so that extreme agitation, even greater than that which can be obtained mechanically, is provided in the fuel mixture in an engine cylinder. This turbulence or agitation in the fuel mixture can be visually inspected through the glass wall of a compression chamber, and the improved operating results of the engine to which the structure is applied are readily apparent. In an internal combustion engine of the fuel injection type for instance, this improvement is apparent in a materially reduced idling speed for the engine. For instance, in one application of the invention, the heavy-duty engine of the fuel injection type idled smoothly at an R. P. M. approximately one-fourth of that which had been possible with any other ignition system and mechanically created turbulence. Furthermore, where at the present time it is necessary to provide complicated and expensive fuel injection pumps for spraying the fuel oil into a cylinder head of an engine of this type under tremendous pressures as high as 4,000 to 5,000 pounds, to supplement the engine head design itself to secure the desired turbulence, we can accomplish improved turbulence with greatly reduced pressure from the pump, thereby permitting the use of less expensive and less complicated pumps.

As a by-product of the electrostatic discharge at the electrode 72, particularly with the plug 63 connected into a high-frequency ignition system, there is a substantial generation of ozone. The maximum ozone generation appears to correspond to the most desired frequency of discharge, viz., approximately 500 kilocycles. The generation of ozone with frequencies below 100 kilocycles is negligible, and it appears that there is a diminution of such generation above 1,500 kilocycles. At approximately the latter frequency, there is likewise apparently a diminution of the turbulence created by the electrostatic discharge. The ozone generated as the result of the electrostatic discharge acts upon the combustible fuel within the cylinder of the internal combustion engine to oxidize the same and make such fuel more highly combustible. As a result of the intense electrostatic flux developed by the electrostatic high-frequency discharge at the plug the particles of fuel and air are charged alternately positive and negative, thereby causing great agitation of the particles due to the electrostatic repulsion of said particles. Thus turbulence and ozone are created by electrical means to act upon the fuel mixture. More complete combustion of such fuel mixture is obtained, and if the electrostatic flux is of sufficient intensity, combustion may take place without the conventional arc discharge. This occurs at all operating speeds, and is possibly most noticeable at low operating speeds where the greatest difficulty has been encountered in the present internal combustion engines and ignition systems therewith.

With the single point at the end of the electrode 66 the electrostatic discharge acts in all directions substantially in the manner as illustrated by the lines emanating from such point. The electrode configuration can be such as to direct the electrostatic discharge in a particular direction and provide a corresponding direction of movement in the fuel mixture. Under certain conditions, it is desirable to create a whirling action in the fuel mixture. This may be accomplished electrically with an electrode for the spark plug 63, as illustrated in Fig. 11, having an end structure in a spiral form. Discharge occurs primarily at the end of each of the arcuately shaped arms 73 extending radially from the straight electrode portion 66 in various directions. A further modification of the spark plug construction is illustrated in Fig. 12, comprising a disc 74 secured to the end of the electrode 66. The disc is provided with a serrated edge 76 from which the electrostatic discharges, or flux, are transmitted, in radial directions from the circumference of the disc. A still further modification is illustrated in Fig. 13 in which a disc 77 is irremovably secured to the end of the electrode 66 and is provided with a broken face 78 with a multiplicity of points from each of which discharges occur to be directed substantially forwardly from the face of the disc, and thus provide agitation in the fuel in a corresponding direction.

In a further embodiment of our invention we provide a spark plug having an enlarged electrode in an enlarged porcelain insulator. The top of the electrode outside the engine head is provided with a coupling for receiving a fuel injection pump connection, as well as a terminal for a high tension lead. The electrode is hollow throughout its length and an opening is provided at the end of the hollow passage, in a single opening as in an electrode such as provided in Figs. 10, 12, and 13, or a multiplicity of openings as at the end of each radial arm 73. We also provide a hollow passage in the center of the insulator through which fuel may be injected, and with such structure employ a cap-like electrode at the bottom end of the insulator connected to a terminal at the top or side of the insulator, and having an opening corresponding to the hollow passage to permit fuel injection therethrough into the engine.

Although our invention is preferably practiced with a high-frequency ignition system such as illustrated in Figs. 2, 4, 9 and 10, we have found that some amount of turbulence is created in a fuel mixture with low-frequency current and a high potential output. For instance, we have found that with any of the spark plugs of Figs. 10 to 13, inclusive, utilized in a low-frequency ignition circuit, such as that illustrated in Figs. 1, 3, and 5, of the drawings, some turbulence is created with an output of 5,000 volts at the secondary gap. This turbulence increases slightly as the output is increased to approximately 11,000 volts. It would appear, however, that with a given output of 11,000 volts, for either a low-frequency ignition circuit, or a high-frequency ignition circuit, there is apparently 100% or more greater turbulence with the high-frequency system than with the low-frequency. We have explained this on the basis of the greater frequency for electrostatic discharges with the high frequency system as contrasted to the low-frequency, and this greater frequency of discharge produces greater velocity in the movement of the fuel mixture. This velocity is, of course, translated into increased turbulence. In addition, the generation of ozone in the high-frequency system in combination with increased turbulence provides an over-all efficiency vastly greater than that possible with the low-frequency system.

In practicing our invention to electrically create turbulence it is possible to provide dimensions for the electrode and insulator elements of the spark plugs of Figs. 10 to 13, inclusive, such that a spark will occur between the electrode and the shell 69 of cylinder head 71 acting as a spark gap. Such a spark normally does not occur until after there have been electrostatic discharges from the point of the electrode for at least a short period of time. In other words, in the practice of one form of our invention we provide in order, turbulence and then an igniting spark so that detonation can't normally occur in the cylinder head. With a gap large enough, the voltage must build up materially at the electrode point 72 before it is great enough to jump to a grounded metal portion of the plug or cylinder structure. In such a system it is necessary to use only a single spark plug to obtain both turbulence and fuel combustion. In fuel oil engines particularly, it is desirable, however, to extend the insulator 64 beyond the end of the shell 69 and thus extend the electrode, as 66, even further beyond the shell so that a spark cannot possibly jump from the electrode to a corresponding grounded portion. In such case, in the absence of sufficient intensity of the electrostatic flux to cause combustion due to insulation limitations it is necessary to use a second spark plug and a second energizing circuit to ignite the fuel in the engine. Such a system is illustrated in Fig. 14, in which a spark plug 63' identical with the plug of Fig. 10, except that the disc 77 of Fig. 13 is provided at the end of the electrode 66 instead of the point 72, is employed. This plug is connected into a high-frequency circuit identical with that illustrated in Fig. 10 and previously described. The fuel is ignited by a spark at a spark plug 19 identical with that in Fig. 1. A low-frequency ignition coil 83 similar to that in Fig. 1 and energized from the storage battery 10 common to the high-frequency circuit supplies the necessary current for the discharge at the plug 19. A second timer unit with contacts 15' and 17', and a breaker 18' is connected into the low-frequency circuit and normally timed so that the igniting spark is slightly later than the electrostatic discharge from the electrode 77. In this manner turbulence and ozone generation precedes the ignition of the fuel to provide the most desirable operating results.

Although we have described our invention in its preferred embodiments, it is understood that such embodiments are merely illustrative and the invention is not limited thereby.

We claim:

1. An ignition system including in a circuit, an energizing source, circuit making and interrupting means, a low-frequency ignition coil and a spark gap including a pair of spaced electrodes with one of said electrodes in connection with said coil, and electrical means acting at said spark gap to produce a low-resistance path thereacross to permit the passage of a heavy current at said gap without destructive burning of said electrodes, said means comprising an electron emitting member at said gap independent of said pair of spaced electrodes and energized independently of the spark discharge at the gap adapted to ionize the space intermediate the electrodes.

2. An electrical circuit adapted to be applied to an internal combustion engine, said circuit including a high-voltage source, a pair of spaced-apart fixed electrode means, with at least one of said electrode means in electrical connection with said high-voltage source, means for enclosing said electrode means of such structure as to permit viewing of said electrode means, and means for evacuating the space between said electrode means in variable amounts to lower the resistance of such space and vary the condition of a spark between said electrode means upon energization of said circuit.

3. An electrical circuit for an internal combustion engine including a high-voltage source, a pair of spaced apart fixed electrode means having a low-resistance path therebetween for a spark discharge, with at least one of said electrode means in electrical connection with said high-voltage source, an electron emitting means independent of said electrode means but positioned adjacent thereto and energizable to ionize the path intermediate the electrode means and means other than the spark discharge at the electrode means for energizing said electron emitting means.

4. An electrical system for an internal combustion engine including in combination a high-voltage source, a pair of spaced apart fixed electrode means, with at least one of said electrode means in electrical connection with said high-voltage source, and means for producing a low-resistance path intermediate said electrode means for preventing destructive burning of said electrode means, with said system being such as to produce simultaneously therewith an enlarged gaseous envelope at said low resistance path to indicate a condition of substantially non-destructive action.

5. A method for creating turbulence in the cylinder of an internal combustion engine in the fuel mixture in said cylinder which consists in directing an electrostatic discharge into said fuel mixture within the cylinder.

6. A method of creating turbulence in the fuel mixture in the cylinder of an internal combustion engine which consists in providing a high-frequency current at a discharge means within the cylinder of such engine, and directing a high-frequency electrostatic discharge from said means into said fuel mixture.

7. A method for creating turbulence in the fuel mixture in the cylinder of an internal combustion engine which consists in providing a low-frequency, high-potential excitation at a discharge means within the cylinder of such engine and directing an electrostatic discharge resulting from said excitation from said means into said fuel mixture.

8. Means for creating electrical turbulence in the fuel mixture in an internal combustion engine including a cylinder, said means including a high-frequency electrical system having a primary circuit and a secondary circuit, and a discharge unit extending from outside said cylinder to the inside thereof connected into the secondary circuit comprising an insulator portion, a single electrode carried in said insulator portion with one end of said electrode extending beyond a corresponding end of the insulator to project into said cylinder with said electrode extension being spaced at any point thereon at least one-eighth inch away from any other conducting surface of the discharge unit and engine.

9. An electrical system for an internal combustion engine including in combination a low-voltage source, and a high-frequency circuit common to said low-voltage source and including therein a fixed electrode unit comprising an insulator portion for mounting at the cylinder head of a cylinder for such engine and having an electrical conductor therein with an extension thereon at the end of said insulator portion within the cylinder of said engine with said extension being of such dimensions and configuration as to direct therefrom an electrostatic discharge for creating turbulence in the fuel mixture within the cylinder, and means for igniting said fuel mixture including a low-frequency circuit common to said low-voltage source and including a spark plug connected into said low-frequency circuit supported in the cylinder head for said cylinder of the internal combustion engine, said spark plug including a pair of spaced-apart electrodes at one end thereof positioned within said cylinder with said electrode unit for carrying a spark at said pair of electrodes for igniting the fuel mixture within the cylinder.

10. An electrical system for an internal combustion engine including a high-voltage source and a fixed electrode unit in electrical connection therewith for mounting in the cylinder wall for a cylinder for said engine, adapted to project an electrical discharge therefrom into the fuel mixture in the cylinder, means for creating said electrical discharge and with said electrical discharge acting for substantially simultaneously creating turbulence in said fuel mixture, generating ozone therefor, and igniting said fuel mixture.

11. An electrical circuit for an internal combustion engine, said circuit having a high voltage source including a high frequency transformer and a pair of fixed electrode means forming a spark gap with at least one of said electrode means in electrical connection with said source, with the electrical output from said circuit at said spark gap being such as to ionize the space between said electrode means and provide a low resistance path, with a path of a desired resistance value and an electrical output of a desired value at said spark gap being evidenced by an enlarged gaseous envelope therebetween during the operation of said circuit.

12. A fixed electrode unit for an internal combustion engine comprising an insulator portion, means for mounting said insulator in said unit and mounting said unit on an internal combustion engine, and an electrode element secured in said insulator portion having an end portion positioned beyond the end of the insulator portion and being the sole electrical conducting structure of said unit positioned beyond said mounting means in a direction longitudinally of said unit, with said end portion of said electrode element being of such shape as to project an electrostatic discharge therefrom in a plurality of directions, the directions and path of said discharge being such as to extend into the fuel mixture in a cylinder for said engine to agitate such fuel mixture.

13. A fixed electrode unit for an internal combustion engine comprising an insulator portion, means for mounting said insulator in said unit and mounting said unit on an internal combustion engine and an electrode element secured in said insulator portion having an end portion positioned beyond the end of the insulator portion and being the sole electrical conducting structure of said unit position beyond said mounting means in a direction longitudinally of said unit, with said end portion of said electrode element including a plurality of radially extending arcuately-shaped arms for projecting an electrostatic discharge from each of said arms simultaneously, the direction and path of said discharge being such as to extend into the fuel mixture in a cylinder for said engine to agitate the fuel mixture.

14. A fixed electrode unit for an internal combustion engine comprising an insulator portion, means for mounting said insulator in said unit and mounting said unit on an internal combustion engine and an electrode element secured in said insulator portion having an end portion extending beyond the end of the insulator portion and being the sole electrical conducting structure of said unit extending beyond said mounting means in a direction longitudinally of said unit, with said end portion of said electrode element being plate-like in shape and having a serrated edge to project an electrostatic discharge from said serrated edge in a plurality of directions depending upon the serrated configuration of said edge, the direction and path of said discharge being such as to extend into the fuel mixture in a cylinder for said engine to agitate such fuel mixture.

15. A fixed electrode unit for an internal combustion engine comprising an insulator portion, means for mounting said insulator in said unit and mounting said unit on an internal combustion engine, and an electrode element secured in said insulator portion having an end portion positioned beyond the end of the insulator portion and being the sole electrical conducting structure of said unit positioned beyond said mounting means in a direction longitudinally of said unit, with said end portion of said electrode element being substantially plate-like in configuration with a face substantially at right angles to the longitudinal center line of said unit and having an irregular surface such as to project an electrostatic discharge from said face in a plurality of directions depending upon the configuration of the irregular surface.

16. Means for substantially eliminating destrutive action on the electrode elements in a stationary spark gap for an ignition system, said means including an electrical circuit including a uni-directional current coil and a high-frequency current coil, means in said circuit for energizing said coils, stationary spark gap means in said circuit including a pair of electrode elements, with said uni-directional current coil and said high-frequency current coil each having a current output value and connected in said circuit in such a manner as to superimpose high-frequency current from the high-frequency current coil on the uni-directional current from the uni-directional current coil in sufficient amount to ionize the space in said spark gap upon effecting a discharge therein and diffuse the uni-directional current component of the discharge over a substantial area of each of said electrode elements.

17. Means as defined in claim 16 for substantially eliminating destructive action on the electrode elements in a stationary spark gap for an ignition system in which the coils are such that the discharge at the stationary spark gap comprises high-frequency current and uni-directional current in the ratio of at least two parts of high-frequency current to one part of uni-directional current.

18. An ignition system including in a circuit, a pair of spaced apart stationary electrodes comprising a stationary spark gap, circuit making and interrupting means, and coil means such as to provide a current output at said spark gap of at least 40 milliamperes, with said stationary electrodes having a low resistance path therebetween to accommodate said current output at said gap substantially without destructive effect upon said electrodes.

19. A method of preparing fuel for combustion in the cylinder of an internal combustion engine, which consists in providing a high-frequency current at a discharge means within the cylinder of such engine, and directing a high-frequency electrostatic discharge from said means into the cylinder admission path of said fuel.

20. A method of preparing fuel for combustion in the cylinder of an internal combustion engine, which consists in providing a low-frequency, high-potential excitation at a discharge means within the cylinder of such engine, and directing an electrostatic discharge resulting from said excitation from said means into the cylinder admission path of said fuel.

21. In an ignition system for an internal combustion engine including a cylinder, an electrode unit insulated from said cylinder, an electrode element in said unit having an end portion extending into the cylinder for projecting an electrostatic discharge therefrom in a direction in substantial alignment with said end portion, the direction being such as to extend into the fuel mixture in said cylinder to agitate and ignite such fuel mixture, and means for mounting said unit in the engine.

22. In an ignition system for an internal combustion engine including a cylinder, an igniter in said cylinder, an electrode unit insulated from said cylinder, an electrode element in said unit having an end portion extending into the cylinder for projecting an electrostatic discharge therefrom in a direction in substantial alignment with said end portion, the direction being such as to extend into the effective igniting area of said igniter to agitate the fuel mixture about said igniter, and means for mounting said igniter and unit on the engine.

HARRY B. HOLTHOUSE.
HARRY B. HOLTHOUSE, JR.